Sept. 9, 1924.　　　　A. J. WADDELL ET AL　　　　1,507,639

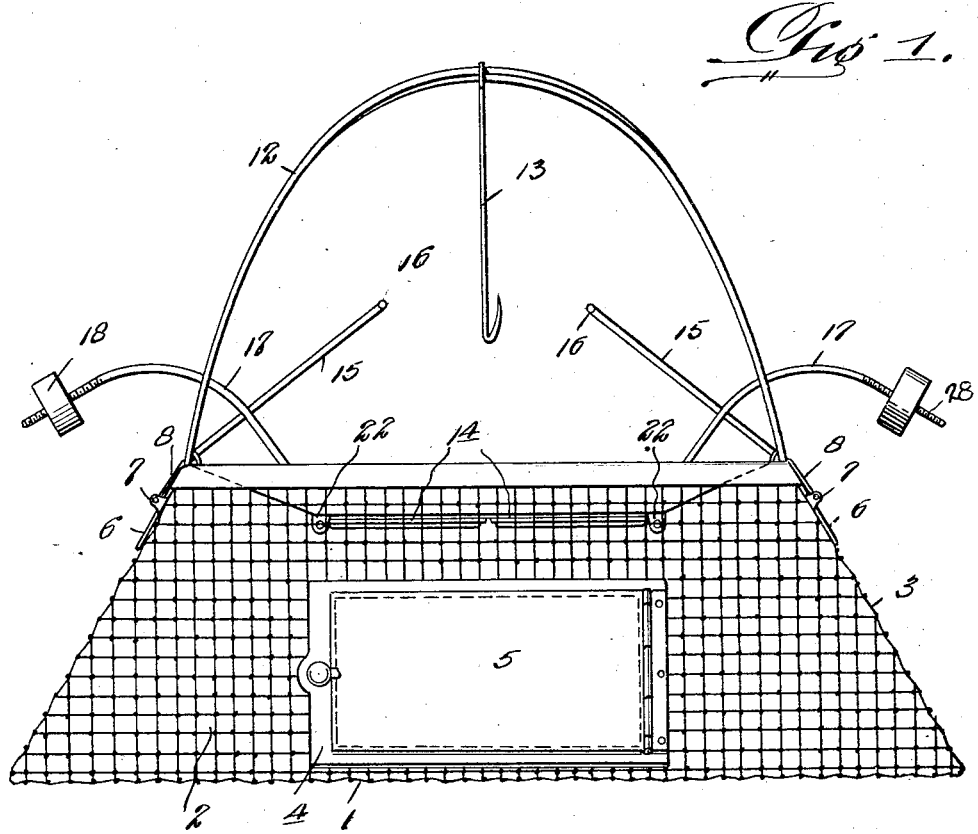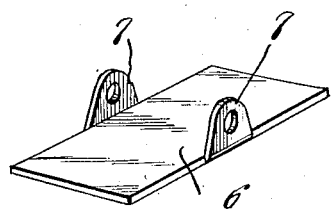

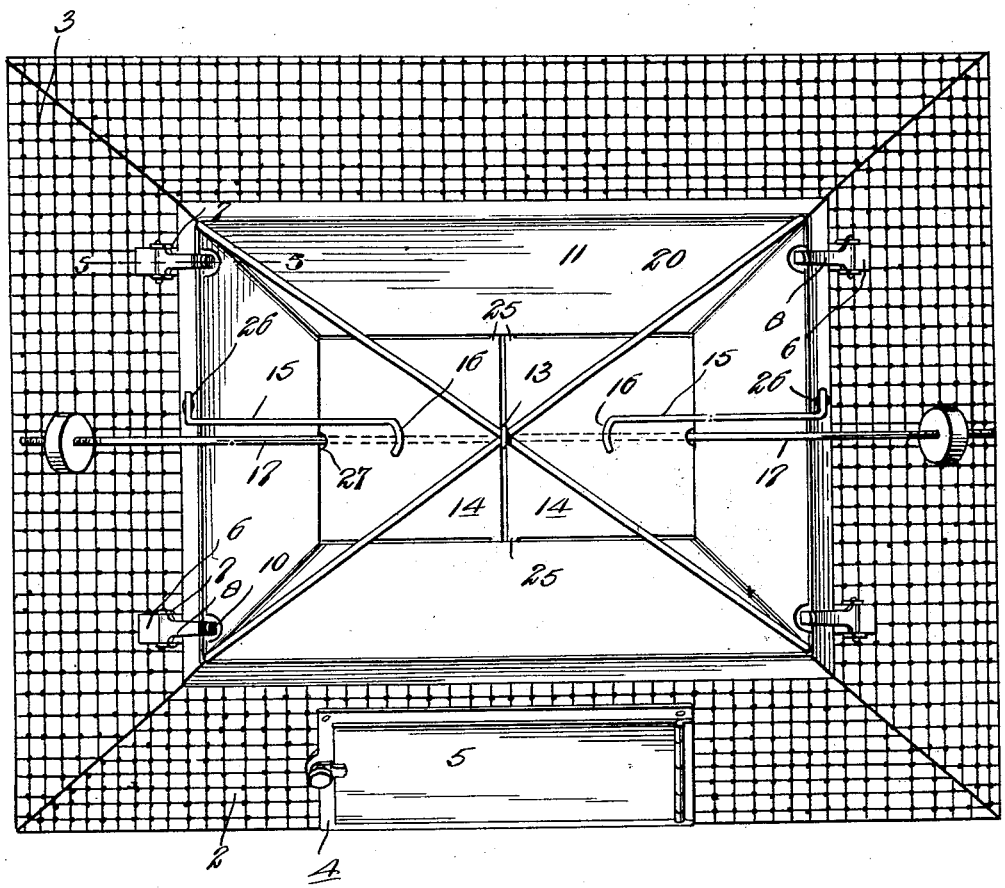
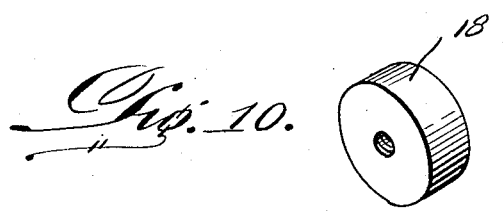

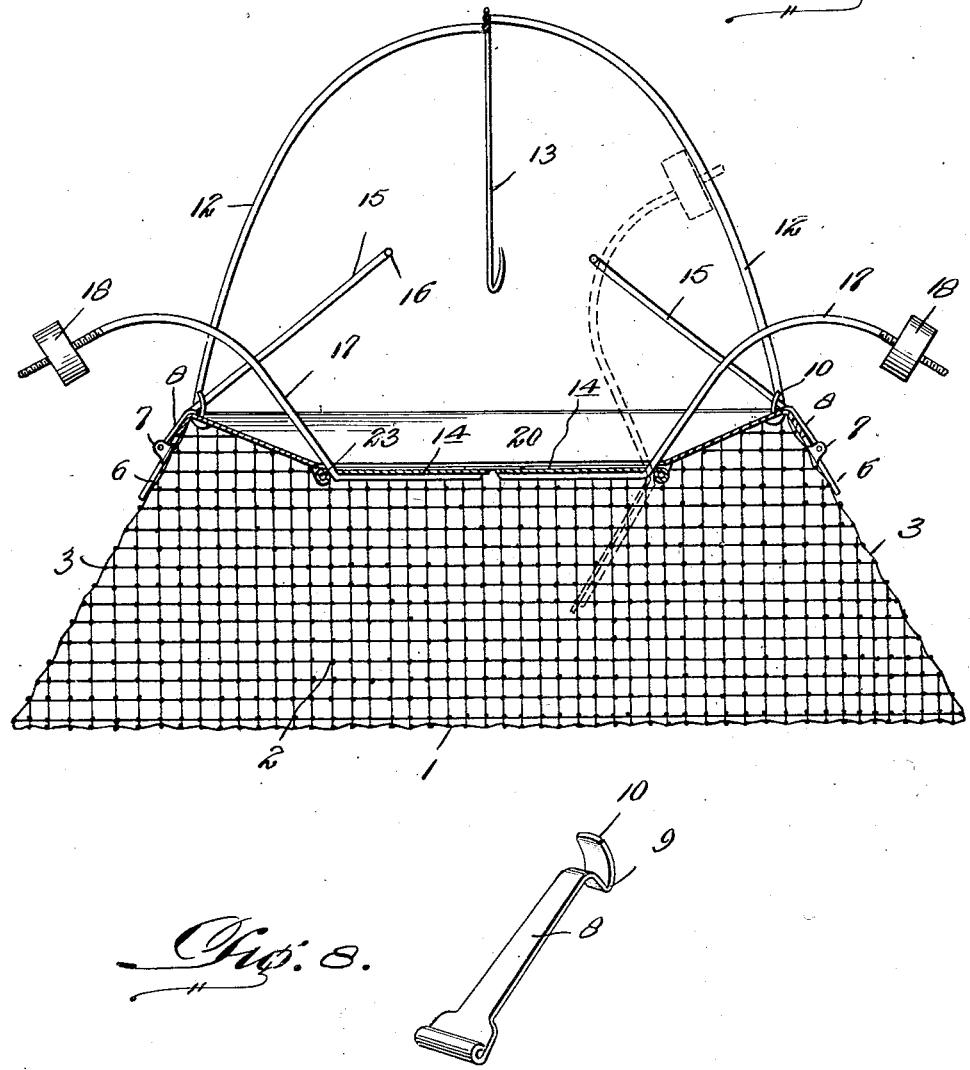

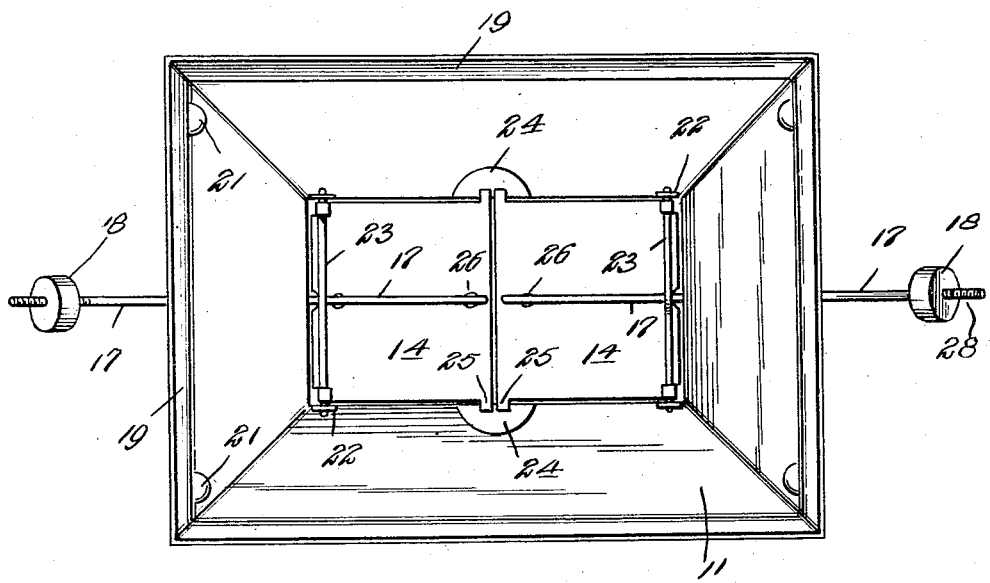

SMALL ANIMAL TRAP

Filed April 25, 1922　　　5 Sheets-Sheet 5

Witnesses:-
William Thickstun
Herman Berman

Inventors
A. J. Waddell
W. W. Waddell
By Clarence Abt Pink
Attorney

Patented Sept. 9, 1924.

1,507,639

UNITED STATES PATENT OFFICE.

ANDREW J. WADDELL AND WASHINGTON W. WADDELL, OF HOLCOMB, MISSOURI.

SMALL-ANIMAL TRAP.

Application filed April 25, 1922. Serial No. 556,383.

*To all whom it may concern:*

Be it known that we, ANDREW J. WADDELL and WASHINGTON W. WADDELL, citizens of the United States, residing at Holcomb, in the county of Dunklin and State of Missouri, have invented new and useful Improvements in Small-Animal Traps, of which the following is a specification.

The object of our said invention is the provision of a decoy-bait trap for mice, rats and other small animals, that is extremely simple in construction, reliable in operation, and well adapted to withstand the exposure and rough usage to which animal traps are ordinarily subjected.

To the attainment of the foregoing, the invention consists in the improvement as hereinafter described and definitely claimed.

In the accompanying drawings, forming part of this specification:—

Figure 1 is a front elevation of our novel trap.

Figure 2 is a top plan view of the same.

Figure 3 is a longitudinal vertical section of the trap.

Figure 4 is an inverted plan view of the top unit of the trap.

Figure 5 is an enlarged vertical fragmentary section taken in the plane indicated by the line 5—5 of Figure 2, and hereinafter explicitly referred to.

Figure 8 is a detail perspective on an enlarged scale of one of the latches.

Figure 9 is a detail perspective on an enlarged scale of one of the fulcrum plates.

Figure 10 is an enlarged perspective of one of the weights.

Similar numerals of reference designate corresponding parts in all of the views of the drawings.

Figure 6:
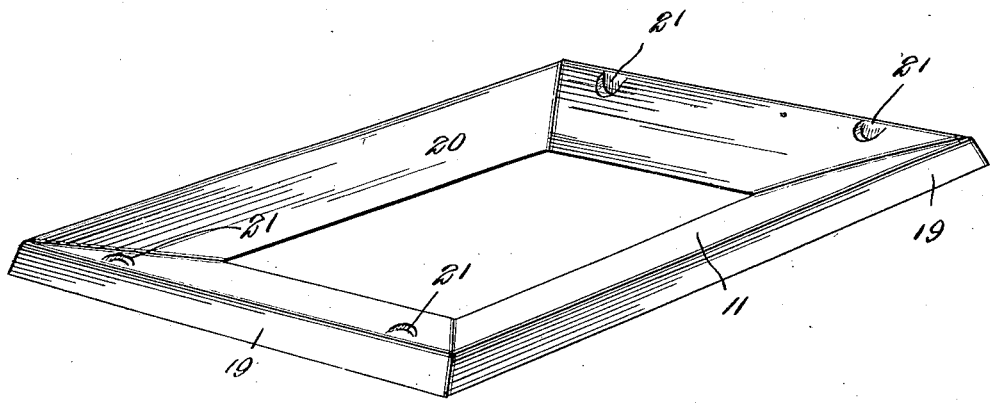
Figure 6 is a detail perspective of the metal frame comprised in the said top unit.
Figure 7:
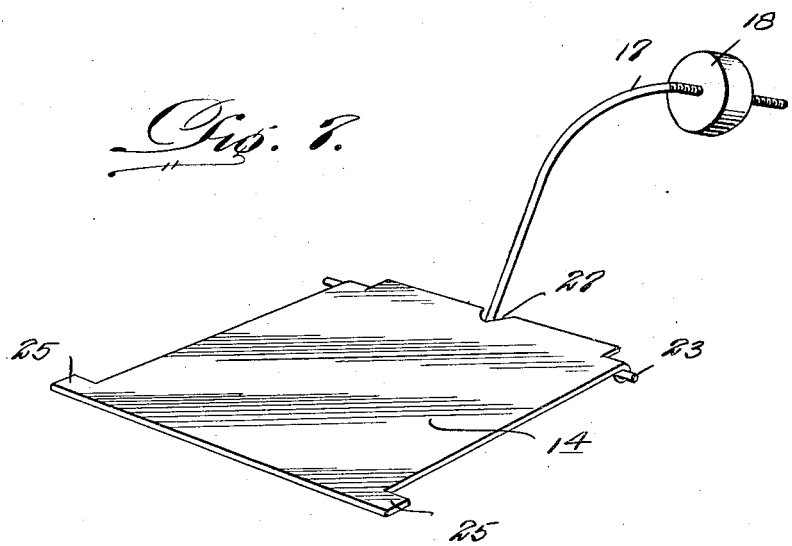
Figure 7 is a detail perspective showing one of the precipitating platforms of the trap and its weighted arm.

Among other elements our novel trap comprises a body which as shown in Figures 1, 2 and 3 is formed of appropriate reticulated material and is made up of a bottom wall 1, side walls 2 and end walls 3; the said side and end walls being inclined inwardly from the bottom wall, and the body being open at its top as appears in Figure 3. In one of the side walls 2 of the body is an opening for the removal of caught animals, the said opening being framed as indicated by a door 5, detachably secured by appropriate means in closed position.

Secured by solder or other means on the upper portions of the end walls 3 of the trap body are fulcrum plates 6 with apertured ears 7, and mounted to swing between the said ears 7 are latches 8, preferably four in number. At their free ends the said latches 8 are provided with pendent hooks 9 which are merged, as shown, into upstanding finger pieces 10.

Detachably secured by the latches 8 on the body of reticulated material so as to effectively close the upper open side of the said body is the top unit of our novel trap. The said top unit includes a frame 11, an arch 12 from which depends a bait-hook 13, tilting platforms 14, stops 15 with lateral terminals 16, upwardly and outwardly extending rods 17 on the tilting platforms 14, and counterbalance weights 18 on said rods 17. As best shown in Figure 4 the frame 11 which is preferably of sheet metal and of open rectangular form, is provided with outer flanges 19 to rest against the side and end walls of the reticulated body, and inner flanges 20 to extend downwardly and inwardly in the body. In the end flanges 20 and near the junction of the same with the flanges 19 are depressions 21 for the reception of the hooks 9 of the latches by which the latches are enabled to strongly hold the frame 11 on the body. It will be noticed, however, that when desired the hook-portions of the latches 8 may be readily sprung out of engagement with the frame 11, whereby the top unit as a whole may be lifted from the body to facilitate cleaning of the trap or for any other purpose. At its underside the frame 11 is provided with apertured lugs 22 to receive the hinge pintles 23 of the platforms 14, and at 24 on its underside the said frame 11 is equipped with pads of rubber or other appropriate sound-lessening material. The said pads 24 are opposed to lateral projections 25 on the platforms 14, and hence it will be understood that the sudden closing of the platforms 14 will be attended by little noise as is desirable in traps. The stops 15 are fixedly connected to the frame 11 at the points 26 as best shown in Figure 2 and the terminal portions 16 of said stops are arranged in the paths of movement of the rods 17 which rods are movable to and from the dotted line positions shown in Figure 3. The inner portions of the rods 17 are fixed by solder or other means at 26, Figure 4, to the undersides of the platforms 14, and the rods are passed upwardly through the notches 27 at the outer ends of the platforms and are curved as shown. The outer end portions of the rods 17 are threaded as indicated by 28 for the adjustable attachment of the correspondingly threaded counterbalance weights 18, this manner of attachment being resorted to in order that the weights 18 may be positioned properly for the prompt closing of the platforms. As best shown in Figure 2 the arch 12 is formed by crossed wires fixedly connected at their ends to the frame 11, and the bait hook 13 is connected to the said wires at the point of intersection thereof.

In the practical use of our novel trap, bait is fastened on the hook 13 and serves to attract animals up the inclined sides of the reticulated body. When an animal reaches the frame 11 of the top unit in its efforts to reach the bait, the flanges 20 tend to cause the animal to slip down to one of the platforms which will give or gravitate with the weight of the animal, whereupon the animal will be precipitated into the body. The weighted arm of the particular platform referred to will then promptly return the platform to its closed position. From this it follows that the trap is of self-setting type, and hence will catch one animal after another. In this connection it will be appreciated that the portion of the reticulated body outwardly beyond the platforms 14 affords ample space for the trapped animals so that there is no liability of them interfering with the working of the platforms 14 incident to the trapping of following animals.

Obviously when desired the door opening alluded to as disposed in the side wall of the reticulated casing body may be made to communicate with a retention compartment (not shown) or, when the trap is used on a vessel, may be so arranged as to permit rats to get away into the water. These features, however, are not of the essence of our invention.

We have entered into a detailed description of the construction and relative arrangement of the parts embraced in the present and preferred embodiment of our invention in order to impart a full, clear and exact understanding of the said embodiment. We do not desire, however, to be understood as confining ourselves to the said specific construction and relative arrangement of parts inasmuch as in the future practice of the invention various changes and modifications may be made such as fall within the scope of our invention as defined in our appended claim.

Having described our invention, what we claim and desire to secure by Letters-Patent, is:—

A trap comprising a body, an open center frame applied to the top thereof, said frame having inclined side walls, a stop member mounted upon the frame at the outer portion thereof and disposed over the side of the frame and having an angularly disposed extremity disposed over the opening in the center of the frame, a platform hinged to the inner edge of the frame and at the same side thereof at which the stop member is mounted, a curved rod mounted upon the platform in the vicinity of the hinged edge thereof, said rod extending over the adjacent side of the frame, a weight carried at the outer end of the curved rod and normally disposed beyond the outer edge of the adjacent side of the frame, the angular extremity of the stop member being located in the path of movement of the rod when the platform is swung in a downward direction with relation to the frame, the parts being so arranged and the curvature of the rod being such that when the platform is swung down, the weight is carried to a point lying vertically between the platform and the frame and the outer edge of the adjacent side of the frame.

In testimony whereof, we affix our signatures.

ANDREW J. WADDELL.
WASHINGTON W. WADDELL.